May 17, 1955 W. G. BOEHM 2,708,501
INTERCONVEYOR TRANSFER MECHANISM
Filed Feb. 8, 1954 3 Sheets-Sheet 3
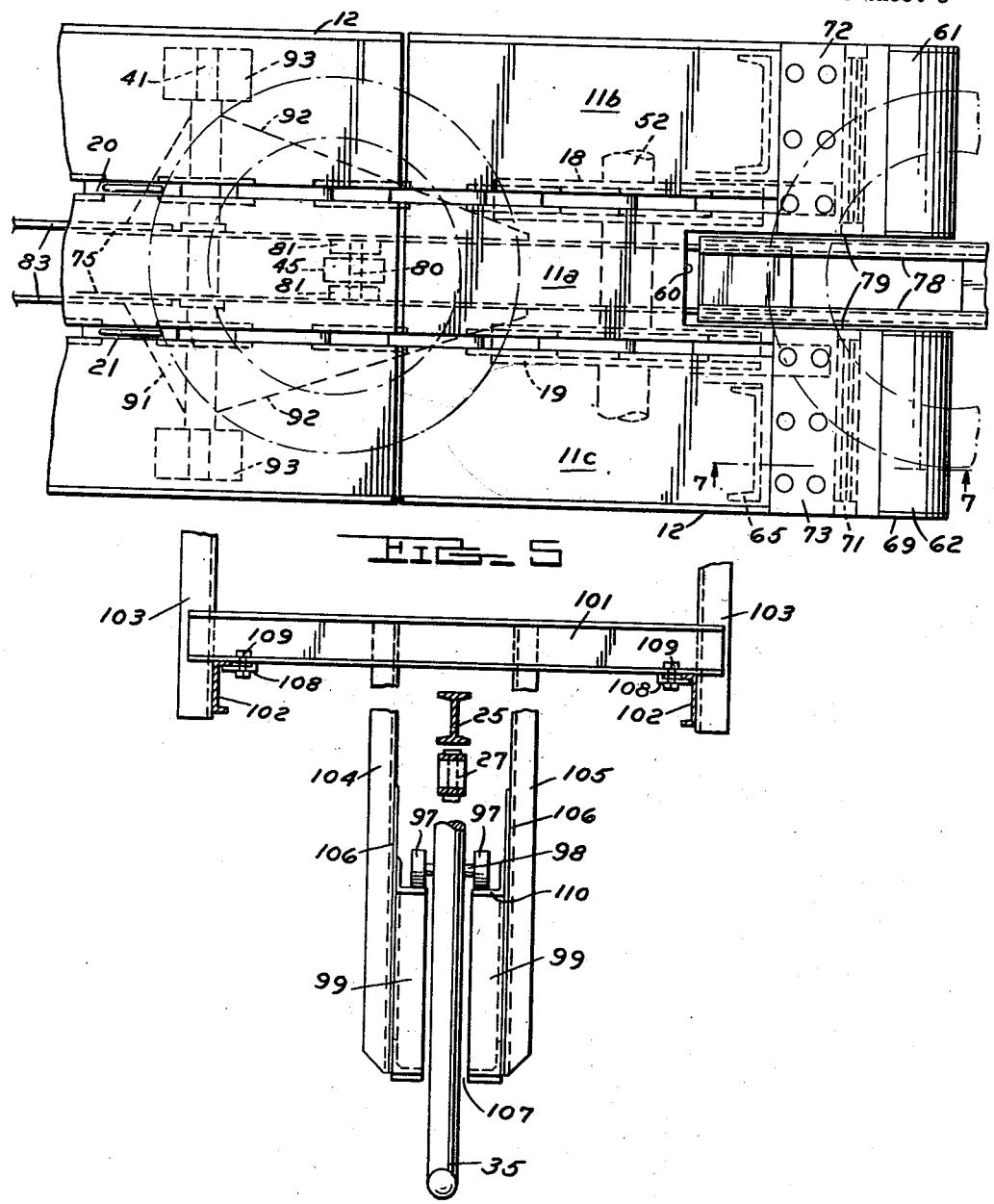
INVENTOR.
WALTER G. BOEHM
BY
Farley Forster + Farley
ATTORNEYS

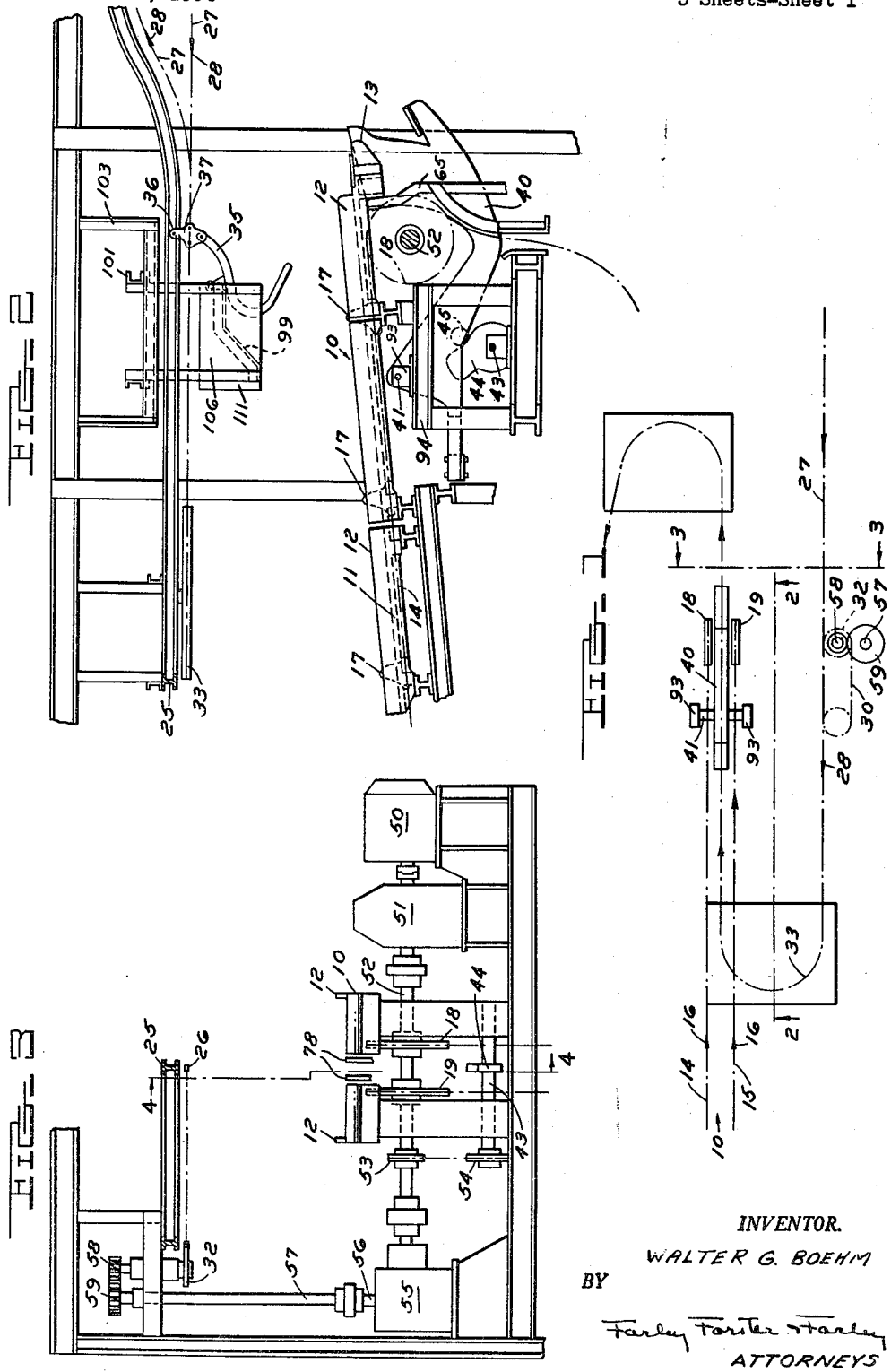

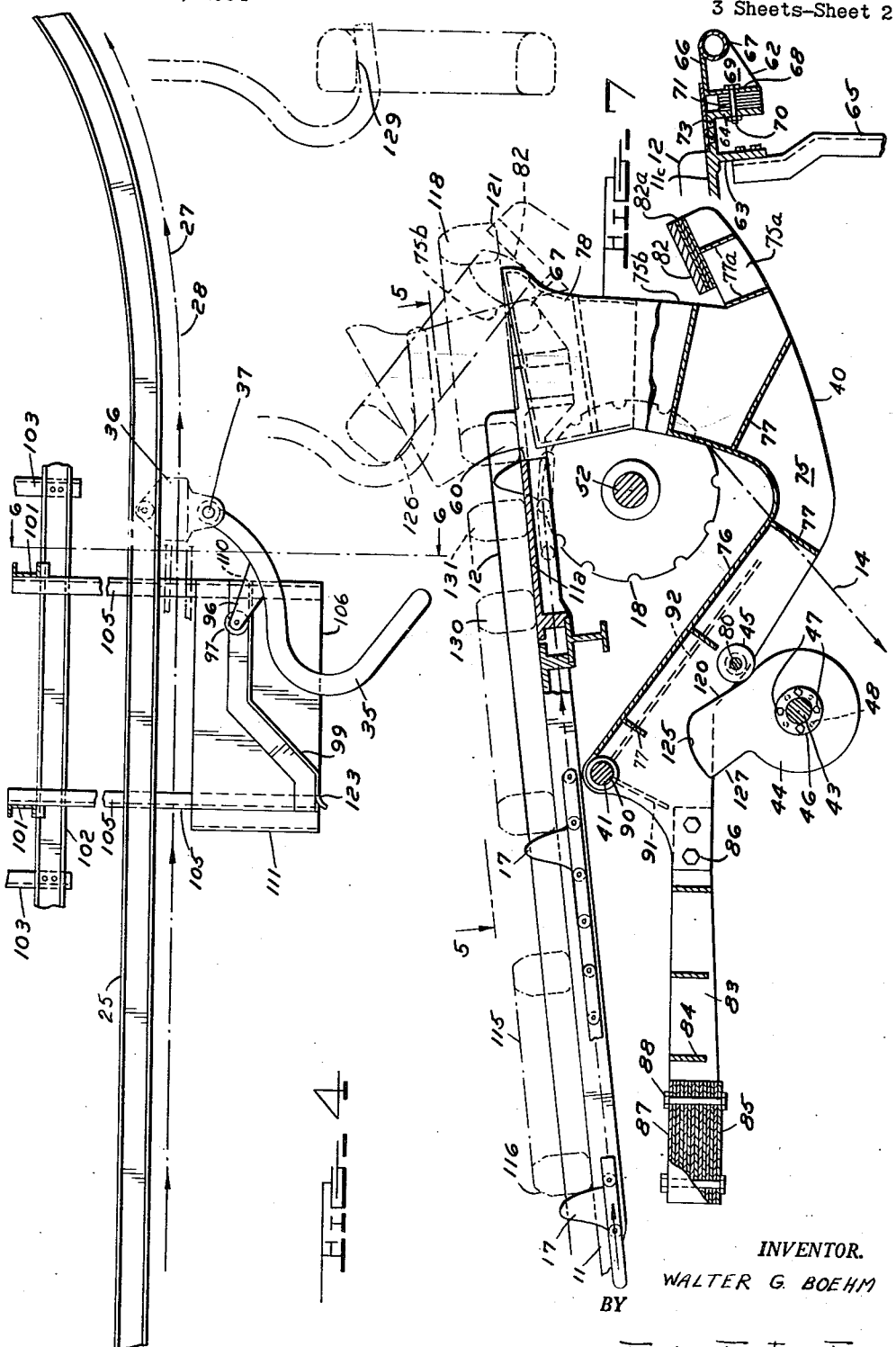

United States Patent Office 2,708,501
Patented May 17, 1955

2,708,501

INTERCONVEYOR TRANSFER MECHANISM

Walter G. Boehm, Birmingham, Mich., assignor to Jervis B. Webb Company, Detroit, Mich., a corporation of Michigan Application February 8, 1954, Serial No. 408,881

13 Claims. (Cl. 198—27)

This invention relates to apparatus for transferring an annular article from one conveyor, where the article is carried with its axis extending in a generally vertical direction, to a second conveyor where the article is suspended from a hook with its axis in a generally horizontal position. The invention has a particular utility in the handling of coils, or bundles, of wire or rod, and the construction to be described herein as illustrative of the invention has been particularly designed for the handling of such articles.

Wire or rod bundles are usually transported from the coiling reel on a coil conveyor, which conventionally comprises a flat bed on which the coils rest and along which they are moved by a pusher member or dog extending through a slot in the bed and propelled by an endless chain traveling below the bed. The bundles are then transferred from this coil conveyor to hooks on an overhead conveyor, and the present invention is concerned with means for effecting this transfer. Examples of means currently in use for this purpose may be found illustrated in U. S. Patents 2,199,061 and 2,643,756 to R. W. Young et al.

The transfer operation involves a rotation of the axis of the coil through approximately 90°, and consequently the transfer station must incorporate some mechanism for producing this rotation. A rod bundle is a particularly difficult object to manipulate through this change of position involved. The material is coiled rather loosely in the bundles which consequently are not perfectly uniform in configuration, and tend to be characterized by occasional loose strands of material projecting from the general mass of the bundle. Bundles are not entirely uniform in size, and to further complicate the situation, the particular transfer described is usually accomplished while the bundles are still hot from the forming operation. If a bundle is not perfectly handled, it may become completely uncoiled, or at the least a few strands may uncoil which will dangle down from the hook of the overhead conveyor and possibly become snagged in some object along the path of travel, thus completely uncoiling the bundle. A mishandled bundle can thus be a very serious thing. The material is hot and hazardous to personnel and is very prone to become entangled in any moving machinery, and consequently, in any case of mishandling the usual procedure is to stop operations until the mishandled bundle can be retrieved.

Advances in other fields have increased production rates in the newer wire and rod mills. More bundles are being formed in a given length of time, consequently creating a need for handling equipment which can be operated on a correspondingly faster cycle. For example, on older equipment bundles were placed on the coil conveyor at approximately 10 to 12 foot centers, and at this spacing transfer equipment such as shown in the Young patents mentioned above gives satisfactory handling of the bundle. Little increase in the operating rate of this equipment can be obtained, however, unless the bundle spacing is materially reduced. Many limitations prevent obtaining greater operating rates by merely increasing the speed of the conveyors and handling equipment involved.

The general object of the present invention is to provide transfer mechanism capable of handling bundles at an increased rate. The coil conveyor is provided with a stationary, overhanging end, which is utilized as a pivot point about which a bundle is tipped. Means are provided for engaging one side of a bundle and tipping it about this pivot point to an angle while preferably simultaneously engaging the lower side of the bundle so that none of its strands will become dislodged. While held in this position, the bundle is engaged by a hook of the continuously moving overhead conveyor which, on further travel thereof, advances the bundle off the end of the coil conveyor, this movement being accompanied by further pivoting about the end of the coil conveyor until the bundle reaches the position where its axis is horizontal and its weight is entirely suspended from the overhead conveyor. In this way forward movement of the bundle is interrupted only long enough for it to be tipped to the angle previously mentioned.

The tipping movement of the bundle is synchronized with the operation of both conveyors involved so that there is no interruption in the forward movement of the conveyors.

Preferably, the transfer mechanism includes means for controlling the position of the hooks on the overhead conveyor during the transfer operation. These hooks are conventionally suspended from the overhead conveyor on a pivotal axis extending transversely of the path of travel so that swinging movement of the hook is possible in the path of travel of the conveyor. The control of hook position involves moving each hook about this pivotal axis so that it is raised rearwardly as it approaches the point of engagement with a tipped bundle. This movement of the hook serves to provide additional clearance between the hook and following bundle. Just prior to the time the hook is to engage the bundle being transferred, the hook reaches a drop-off point and is allowed to swing downwardly from its rearward position and through the core of a tilted bundle. After the hook contacts the bundle, the bundle tilting means begins a lowering movement, transferring the raised side of the bundle to the hook. This mode of operation aids in preventing mishandling because it results in placing the bundle as far back on the hook as possible, and also because it achieves a more even shifting of the weight of the bundle from the tilting means to the hook.

Another cause of mishandling has been eliminated by the relationship preferably provided between the coil and overhead conveyors. The overhead conveyor is provided with a run or section which is substantially parallel to the center line of the coil conveyor and coextensive with the last portion of the coil conveyor. This enables the hooks of the overhead conveyor to be brought into an aligned path of travel with the coil conveyor and allows them time to become stabilized in this path of travel. At the transfer point, only a straightforward motion of the bundles is involved, no lateral shifting of a bundle being required to bring it into alignment with the path of travel of a hook. At the same time, the elevation of the overhead conveyor is brought down to reasonably close proximity to that of the coil conveyor, and a rise is preferably provided in the overhead conveyor in the region where the weight of a bundle is shifted onto the hook. This also aids in placing and retaining a bundle as far back on a hook as possible.

The means for tilting a bundle to a transferring angle preferably consists in a pivotally mounted lever having a shoe adapted to engage one side of the bundle from below. This shoe is carried on one end of the lever, and the position of the lever is preferably controlled by a cam driven in synchronism with the drives of both conveyors. The tilting action of the lever can thus be accurately controlled as a function of the shape of this cam, and the lever is preferably counterbalanced to reduce the power requirements and make its operation more smooth.

Another preferred feature found in the construction to be described is that each of the components most effecting the transferring operation can be adjusted to obtain the best interrelationship for the conditions actually encountered. This adjustability considerably simplifies the work of initially setting up the equipment and provides means for compensating, to some degree, for any change in conditions that might develop in service.

An installation incorporating the above features is illustrated in the accompanying drawings comprising the following views:

Fig. 1, a schematic plan view showing a representative relationship between coil and overhead conveyors in the vicinity of the transfer point;

Fig. 2, a side elevation of the transfer station. The location of this station with respect to the schematic view of Fig. 1 is indicated by the arrows 2—2 thereon, but the bed of the coil conveyor is shown sectionally along the longitudinal center line thereof for clarity;

Fig. 3, an end view of the transfer station taken in the direction of the arrows 3—3 of Fig. 1;

Fig. 4, a sectional elevation on an enlarged scale taken through the transfer station as indicated by the line 4—4 of Fig. 3;

Fig. 5, an enlarged plan view of the end of the coil conveyor taken as indicated by the arrows 5—5 on Fig. 4;

Fig. 6, an enlarged end elevation showing the hook control mechanism and taken as indicated by the arrows 6—6 of Fig. 4; and Fig. 7, a sectional detail of the construction of the end of the coil conveyor bed taken along the line 7—7 of Fig. 5.

The general relationship between the conveyors involved can be seen from Figs. 1 to 3. The coil conveyor, generally indicated by the reference 10, includes a flat bed 11, on which the coils or bundles rest, bordered by vertical side flanges 12, the bed sloping gradually upwardly toward the end 13 of this conveyor. Motivation on the coil conveyor is supplied by a pair of endless chains 14 and 15 which are schematically shown by dot-dash lines in Fig. 1, and travel in the direction of the arrows 16. Each of these chains is equipped with a number of equally spaced pusher dogs 17 which are arranged in transversely aligned pairs throughout the length of the conveyor. At the end of the conveyor, the chains 14 and 15 pass around sprockets 18 and 19, respectively. The chains travel below the bed 11 of the conveyor, and the dogs project upwardly through the bed in slots 20 and 21 (see Fig. 5).

The overhead conveyor is of the overhead trolley type, consisting of an I beam track 25 and an endless chain 26 which is suspended from wheeled trolleys supported on the track. In Fig. 1, the path of travel of the chain 26 is indicated by the broken line 27, and its direction of travel by the arrows 28. The chain 26 is propelled by a driving unit generally designated by the reference 30 in Fig. 1, and including a sprocket 32.

The overhead conveyor passes around a curved section 33 where it intercepts the center line of the coil conveyor and assumes a direction of travel parallel therewith as the two conveyors approach the transfer station. A number of hooks 35 are each carried by a trolley 36 of the overhead conveyor at equally spaced intervals, each hook being mounted on a pivotal axis 37 extending transversely to the path of travel of the conveyor, for free swinging movement about this axis.

The individual structural members of both the coil and the overhead conveyor mentioned in the foregoing description are all generally conventional and for that reason have been neither shown nor described in particular detail. Likewise, all the necessary supporting structure for these particular elements has not been shown in detail, not only because of the fact that the design of such structure is well within the capability of a man skilled in this field, but also because the particular structure required is something that will vary from one installation to another.

A coil tipping lever 40 is pivotally mounted on a shaft 41 underneath the end of the coil conveyor, the lever extending along the center line of the coil conveyor and being located intermediate the chains 14 and 15 and sprockets 18 and 19 thereof. Only the outer end of this lever is shown in Fig. 3 in order to more clearly illustrate the drive train. A cam shaft 43 is mounted below and parallel to the lever supporting shaft 41, and carries an actuating cam 44 which is positioned on the longitudinal center line of the lever and contacts a roller follower 45 carried by the lever. The cam 44 is secured to a collar 46 of the shaft 43 by bolts 47 and is provided with a series of holes 48 so that its angular position can be adjusted on the shaft (see Fig. 4).

Movement of all the foregoing components—the coil conveyor, the overhead conveyor and the actuating cam 44 is synchronized, this being accomplished in the arrangement shown by driving all components from a common source. Referring to Fig. 3, a motor 50 is shown coupled to a reducer 51. The reducer in turn is coupled to a shaft 52 upon which are mounted the chain sprockets 18 and 19. A third sprocket 53 is also mounted on the shaft 52 and is suitably coupled to a sprocket 54 mounted on the cam shaft 43. Shaft 52 is also coupled to a second gear box 55, which incorporates a right angle drive train, and the output shaft 56 thereof is coupled to a vertically extending drive shaft 57. The drive sprocket 32 of the drive unit 30 for the overhead conveyor, is carried on a shaft 58 which is driven from the shaft 57 by suitable gearing 59.

The construction and operation of the transfer mechanism is best shown in Figs. 4 and 5, which have been drawn on an enlarged scale. Fig. 4 is a section taken along substantially the longitudinal center line of the coil conveyor and shows the component parts in full line in the relative positions occupied at the beginning of the transfer cycle. Relative positions at the instant a bundle is engaged by a hook are shown in phantom. Before explaining the movement of the parts in effecting a transfer, the construction of the various components will be described in greater detail, namely, the coil conveyor, the tipping lever, the hooks of the overhead conveyor and the means employed for controlling their position.

Turning first to the coil conveyor, the end thereof is bifurcated as can be seen from the plan view of Fig. 5. A slot 60 is provided in the center section 11a of the end bed plate, this slot being located at either side of the longitudinal center line of the coil conveyor bed and intermediate the pusher dog slots 20 and 21 thereof. Terminal pieces 61 and 62 extend the length of the slot and are secured to the side sections 11b and 11c, respectively, of the end bed plate, this construction being shown in detail in Fig. 7. The bed plate sections are formed of castings, and the ends of the sections 11b and 11c are reinforced by a pair of depending flanges 63 and 64. The inner of these flanges 63 is secured to a generally vertically extending channel member 65 which forms part of the framework supporting the bed of the coil conveyor. Each of the terminal pieces 61 and 62 has an upper surface 66 forming a continuation of the conveyor bed, and which fairs into a tubular cross member 67 forming a rounded end for the conveyor bed and the point about which the bundles are pivoted during the transfer operation. A generally vertically extending flange 68 depends from the surface 66, and this flange is connected with the tubular member 67 by a pair of side plates 69. Suitable bolts 70 are employed to connect the flange 68 of the terminal pieces 61 and 62 to the outer depending flange 64 of the bed sections 11b and 11c. A number of spacers or shims 71 are employed at this connection to adjustably position the bed extensions 61 and 62. Plates 72 and 73 are included to bridge the gap between the upper surfaces of the bed sections 11b and 11c and the upper surface 66 of the terminal pieces 61 and 62, respectively. Each of these plates 72 and 73 is secured to its respective bed section within a notch formed in the upper surface thereof so that the upper surface of the plates are at the level of the supporting surface of the beds.

The notch or bifurcation 60 formed in the end of the bed of the coil conveyor allows upward movement of the coil engaging end, or shoe, of the tipping lever 40 through the bed surface. The construction of the tipping lever 40 is composite, being made up of a pair of longitudinally extending side plates 75 interconnected by a transverse plate 76 and suitable reinforcing webs 77, thus forming a channel shape of cross-section for the lever 40. The cam roller follower 45 is carried on a shaft 80 between bearing blocks 81 secured to each of the lever side plates 75 (see Fig. 5). A coil-engaging shoe 78 is secured to each of the side plates 75 of the tipping lever. These shoes 78 are spaced to either side of the center line of the path of travel of the conveyor and are in clearance relationship with the side walls 79 of the slot 60. Each side plate 75 of the tipping lever is preferably provided with a projection 75a located below and forwardly of the shoes 78. These projections 75a are connected by ribs 77a and form a mounting for a coil supporting pad 82 which rests upon a suitable number of shim plates 82a so that the distance between the upper or coil-engaging surfaces of the shoes 78 and the upper surface of the pad 82 can be adjusted. The lower strands of the coil are supported by the pad 82 and by the adjacent ends 75b of the side plates 75 when the coil reaches the tipped position shown in phantom in Fig. 4.

A counterweight boom structure for the tipping lever is made up of a pair of side plates 83 which are connected by transverse ribs 84 and a counterweight supporting pad 85. Each of the side plates 83 of the counterweight boom are secured to the side plates 75 of the tipping lever by bolts 86. A suitable number of plates 87 are carried on the weight supporting pad 85 and secured thereto by bolts 88, with the total weight of the plates being less than required to completely balance the entire lever assembly about its pivot.

The lever assembly 40 is permanently secured and braced to the supporting shaft 41 by collars 90 welded to the lever side plates 75 and to the shaft 41, and by pairs of gusset members 91 and 92 also secured to the shaft 41 and to the side plates 75. Shaft 41 is supported between a pair of bearings 93 mounted on supporting frame members 94 (see Fig. 2).

Each hook 35 is provided with a rearwardly extending bracket 96. A pair of rollers 97 (see Fig. 6) are rotatably mounted on an axle 98 carried by this bracket 96.

The hook positioning means include a pair of angle section track members 99 adapted to engage and support the rollers 97. These track members 99 are carried by an overhead framework shown in Figs. 4 and 6. This framework consists of two channel members 101 which extend transversely of the path of travel of the overhead conveyor across the span between a pair of longitudinally extending members 102 which are supported from above by members 103, the transverse members 101 resting on the upper flanges of the longitudinal members 102. Pairs of angle members 104 and 105 are secured to and depend from the transverse members 101 on either side of the conveyor track 25, the pair of members 104 being placed to the left of the track and the members 105 to the right thereof as the construction is viewed in Fig. 6. Each of the pairs of members 104 and 105 are connected by a longitudinally extending plate 106 having an outwardly flared end 111. One of the track members 99 is secured to each of these plates, so that the track members are separated by a longitudinally extending slot 107 through which the hooks 35 travel.

Connection between the transverse frame members 101 and longitudinal frame members 102 is frictional, being established by track clamps 108 secured to the lower flange of the members 101 by bolts 109 so that the position of the hook release or drop point established by the ends 110 of the track members 99 is adjustable along the path of travel of the overhead conveyor.

The transferring operation of the equipment will be briefly described. Referring to Fig. 4, each bundle, such as the bundle 115, is placed on the bed of the coil conveyor ahead of an advancing pair of the transversely spaced dogs 17, whose transverse spacing has a centering effect upon the bundle with relation to the longitudinal center line of the bed of the coil conveyor. Under normal conditions this centering effect is sufficient to properly position the bundles transversely on the conveyor, and the side rails 12 along the edges of the conveyor bed are provided as a safety factor only.

Bundle 118 in Fig. 4 has been pushed along the bed of the coil conveyor by a pair of dogs to the point where the actual transfer operation is about to begin. Both the conveyor drive shaft 52 and tipping lever cam shaft 43 are rotating in a clockwise direction as the parts are viewed in this figure, and it can be seen that the cam follower 45 is just about to contact the rise portion 120 of the lobe of cam 44. The forward end 121 of bundle 118 has been advanced beyond the rounded end 67 of the conveyor bed, and the rear circumference of bundle 118 is still engaged by a pair of moving driving dogs. Thus, as the cam follower 45 contacts the rise 120 of the cam, the tilting lever 40 begins a counterclockwise pivoting movement, and its pair of shoes 78 are raised upwardly through the slot 60 in the coil conveyor bed. At the same time the bundle 118 is still being moved over the bifurcated end of the conveyor bed so that actual contact between the shoes 78 of the lever and the coil occur at a point where the coil is forwardly of the full-line position shown, and is approaching an unbalanced position on the bed of the conveyor. Further upward movement of the shoes 78 of the pivoting lever 40 results in a rocking motion of the bundle about the pivot surface 67. Upward movement of the tipping lever 40 continues until the bundle has reached the position shown in phantom line. In this final tipped position, the forward portion of the bundle is engaged by the supporting pad 80 and the ends 82 of the tipping lever so that no shifting of the bundle, or any of its individual strands, will occur through the action of gravity while awaiting engagement by a hook of the overhead conveyor.

Motion of the overhead conveyor is continuous and in synchronism with that of the coil conveyor and tipping lever, as previously explained. As bundle 118 approached the end of the coil conveyor, a hook 35 was simultaneously approaching on the overhead conveyor. The rollers 97 carried by this hook were guided by the flared surfaces 111 and 123 onto the tracks 99 and rode up the inclined section thereof to draw the hook rearwardly and upwardly to the full-line position shown.

As the tipping movement of the bundle takes place, the hook 35 is continually advancing, still supported in a rearward and upward position on the tracks 99. The position of the supporting framework for the tracks 99 is adjusted along the beams 102 so that the rollers 97 reach the drop-off point at the ends 110 of the tracks 99 just after tipping movement of the bundle has been completed. The hook then drops off the supporting tracks 99 and swings downwardly and forwardly between the pair of shoes 78 of the tipping lever, through the core of the bundle, and into contact with the outer strands thereof. Moving the hook into positive engagement with the handle in this manner results in any straggling, disarranged strands of the bundle being gathered in and bunched on the hook.

With relation to cam 44, the drop-off point of the hook is adjusted to preferably occur just after the roller 45 has contacted the dwell arc 125 thereof. The bundle is thus held in tipped position by the lever 40 for an additional period after drop-off while the roller follower 45 travels around the remaining portion of the dwell arc, providing time for swinging of the hook movement and a tolerance for minor variations of the various movements from perfect synchronism.

There is no tendency for the hook to oscillate back in pendulum fashion out of engagement with the bundle, for the hook pivot 37 is continually advancing with the overhead conveyor and reaches a position substantially above the bundle by the time the hook completes its swinging motion into engagement. Also, a certain amount of friction is set up between the bundle and hook to further resist oscillation. When the roller follower 45 reaches the end of the dwell arc 125 and moves on to the portion 127 of the cam 44, the tipping lever 40 is rapidly lowered, and during the initial part of this movement, the weight of the coil is shifted entirely onto the hook 35.

As this shifting first takes place, the hook pivot 37 has not reached a position above the end members 67 of the coil conveyor, but is rearwardly thereof so that the bundle settles onto the hook in a tipped or inclined position. The fact that the lower or forward portion of the bundle is supported at a point ahead of the hook pivot tends to draw the hook forwardly through the core of the bundle, or conversely, to place the bundle well back on the hook, in the event that such a carrying position had not been completely established by the swinging bundle engaging movement of the hook. Shifting of weight to the hook is not abrupt; also because of the fact that the forward end of the bundle is still supported by the end of the coil conveyor, and the bundle gradually slides off the rounded end members 67 as the hook continues its advance. At the same time, the path of travel of the overhead conveyor begins to diverge upwardly to aid in effecting a more gradual transfer of the weight of the bundle onto the hook and to secure a more positive placement of the bundle thereon.

When the tipping lever begins its downward movement, a trailing coil 130 has been advanced to the position indicated in phantom at 131, showing that ample clearance still remains between such a trailing coil and the projecting shoes 78 of the lever 40. Return movement of the tipping lever is by gravity, and the weight of the counterweight plates 87 employed at the end of the counterweight boom is not quite sufficient to counterbalance the structure of the tipping lever on the opposite side of its pivot point. This counterweight does, however, make the motion of the lever more smooth, reduce the power required for lifting movement, and reduce the shock on the actuating cam 44 during return movement.

From the foregoing description of the transfer operation, it is apparent that the necessary rotation of the axis of a bundle from a vertical to a horizontal position is accomplished smoothly, without interruption (save for the slight dwell period) and as part of the advancing movement of a bundle, which is pivoted about the end of the coil conveyor by the combined action of the tipping lever and as part of the advance of this bundle by a hook on the overhead conveyor. The effort required for rotation of a bundle is minimized by the fact that it is brought to a position where its forward portion overhangs the end of the coil conveyor, or pivot point before rotary movement is initiated so that a considerable amount of the effort required is supplied by gravity.

The net result of the several features of the transfer mechanism is to considerably reduce the interval or spacing necessary between successive bundles while achieving smooth rotation thereof and transfer of weight from the coil to the overhead conveyor. Three major adjustments are provided in the transfer mechanism to insure proper operation—adjustment of the pivot point or end of the coil conveyor longitudinally thereof and relative to the tipping lever and hook drop-off point; adjustment of the hook drop-off point longitudinally of the hook conveyor and relative to the tipping lever and pivot point; and, adjustment of the angular position of the cam on its cam shaft.

The construction disclosed and described herein is merely representative of the invention defined in the following claims.

I claim:

1. Means for handling annular articles which are first advanced along a conveyor with their axes extending substantially vertically and then transferred to a second conveyor where each article is suspended from a hook with its axis extending substantially horizontally, including a pair of laterally spaced drive chains on said first conveyor, pairs of longitudinally spaced, transversely aligned drive dogs carried by said drive chains and projecting upwardly through slots in the bed of said first conveyor, a pair of sprockets positioned beneath the bed of said conveyor adjacent the end thereof, one of said chains being trained about each of said sprockets, an article tipping member positioned below said first conveyor and intermediate said sprockets, said second conveyor being equipped with longitudinally spaced depending hooks, said tipping member having a pair of laterally spaced article contacting shoes positioned on either side of the path of travel of said hooks, an aperture formed in the supporting surface of said first conveyor adjacent the end thereof and overlying said shoes, means for moving said tipping member upwardly through said aperture in timed relation to the movement of said first and second conveyors whereby said shoes are adapted to engage the rear portion of an article after the forward portion thereof has moved beyond the end of said first conveyor, the said end being formed to provide a pivot surface about which said article is tilted to a position where it is supported by said pivot surface and said shoes for engagement by a hook advancing on said second conveyor and contacting said tilted article between said shoes.

2. Article handling means according to claim 1 further characterized by the inclusion of means for adjusting the relative position between the said pivot surface of the end of said first conveyor and said tipping member in a direction longitudinally of said first conveyor.

3. Article handling means according to claim 1 further characterized by said article tipping member comprising a lever, means mounting said lever on a pivotal axis extending transversely of said first conveyor, a cam follower carried by said lever, and said means for moving said tipping member including a cam contacting said cam follower, said cam being driven in synchronism with the motion of said sprockets.

4. Article handling means according to claim 1 further characterized by said hooks of said second conveyor each being mounted on a pivotal axis extending transversely of the direction of travel thereof, and hook positioning means adapted to move the article engaging portion of each hook upwardly and rearwardly to the direction of travel thereof as said hooks approach a position above the end of said first conveyor, said hook positioning means defining a drop-off point at which each hook is allowed to swing forwardly and downwardly into engagement with an article supported in tilted position.

5. Article handling means according to claim 4 further characterized by means for adjusting the relative position between said drop-off point and said tipping member in a direction longitudinally of said conveyors.

6. Means for handling annular articles including a first conveyor having a supporting surface on which the articles are placed with their axes extending substantially vertically, means for advancing articles along said first conveyor to a position where the advancing end of each article overhangs the end of said conveyor, a second conveyor located above said first conveyor and provided with spaced depending hooks facing in the direction of travel of said second conveyor, said second conveyor including a portion extending parallel to the center line of the end portion of said first conveyor, a tipping member located beneath the end of said first conveyor, means mounting said tipping member for movement in a generally vertical direction through an aperture provided in the supporting surface of said first conveyor, and means for moving said tipping member in timed relation with the movement of said first and second conveyors whereby said tipping member engages the rear portion of an article after the forward portion thereof has been advanced beyond the end of said first conveyor and raises said rear portion upwardly into the path of travel of an advancing hook on said second conveyor, the end of said first conveyor providing a surface about which the article is pivoted during tipping movement thereof and after the engagement thereof by a hook on said second conveyor.

7. Article handling means according to claim 6 further characterized by the end surface of said first conveyor being formed by a pair of overhanging end pieces adapted to provide continuations of the supporting surface of said first conveyor, said end pieces being laterally spaced to provide a slot along the longitudinal center line of said first conveyor and defining said aperture, means adjustably securing said end pieces to said first conveyor whereby the distance between the end surface thereof and said tipping member can be adjusted longitudinally of said first conveyor.

8. Article handling means according to claim 6 further characterized by said second conveyor being provided with an upwardly inclined section, said section beginning at a point vertically above the end of said first conveyor whereby the engagement of an article by a hook on said second conveyor is accompanied by upward movement of said hook.

9. Article handling means according to claim 6 further characterized by said tipping member being provided with means for engaging the forward portion of an article as such article approaches the limit of tipping movement to positively maintain the article in tipped position.

10. Article handling means according to claim 9 wherein said engaging means include a supporting pad, and means for varying the distance between the article-engaging surface of said pad and the surface of said tipping member which engages the rear portion of an article.

11. Transferring means for use in combination with a pair of conveyors for transporting annular articles, the first conveyor of said pair having a flat surface along which the articles are advanced in spaced relation with their axes extending generally vertically, the second conveyor having a series of depending hooks upon which the articles are supported with their axes extending generally horizontally, said second conveyor being arranged with a portion extending parallel to the last portion of said first conveyor and along which said hooks travel in the same direction as said first conveyor; characterized by said first conveyor including pairs of transversely aligned dogs adapted to engage spaced points around the circumference of an article, said dogs being spaced on either side of the center line of said first conveyor and defining a path of travel of said articles substantially along the center line thereof and substantially vertically aligned with the center of said second conveyor, said first conveyor being provided with a bifurcated overhanging end section forming a continuation of the supporting surface thereof, said pusher dogs being arranged to propel each article along said first conveyor to a point where the advancing end thereof projects beyond the outer edge of said bifurcated end section, said outer edge being adapted to act as a surface about which said article is pivoted to a position where its axis extends substantially horizontally, an article engaging member positioned below said bifurcated end section and mounted for reciprocating movement in a generally vertical direction through said bifurcation and upwardly above the level of the supporting surface of said first conveyor, and means for moving said first conveyor, said second conveyor and said article-engaging member in timed relation whereby said engaging member is brought into contact with the rear portion of an article after the advancing portion thereof has passed beyond said outer edge of said bifurcated section to produce a tipping movement of said article to a position for engagement by and transfer to a hook advancing on said second conveyor, the transfer being accompanied by further pivoting movement of said article about said outer edge of said end section.

12. Transferring means for use in combination with a pair of conveyors for transporting annular articles, the first conveyor of said pair having a plane surface along which the articles are advanced in spaced relation with their axes extending generally vertically, the second conveyor having a series of depending hooks to which the articles are transferred with their axes extending generally horizontally, said second conveyor being arranged with a portion thereof extending parallel to the last portion of said first conveyor and along which said hooks travel in the same direction as the direction of travel of said first conveyor, said transferring means comprising an article pivot provided by terminating the said plane surface of said first conveyor transversely thereof, means for moving each article along said plane surface to a position where the leading end thereof overhangs said pivot, means for tilting each article about said pivot including a member mounted for generally vertical movement and positioned to engage the trailing portion of each article when such article has reached the said position where the leading end thereof overhangs said pivot, and means for raising said member in timed relation with the approach of a hook on said second conveyor whereby said article is tilted about said pivot to a position where said trailing portion thereof is placed for engagement by said advancing hook and for further tipping movement about said pivot in response to the further advance of said hook after the engagement of said article thereby.

13. Means for handling annular articles comprising a first conveyor having a supporting bed upon which said articles are advanced with their axes extending substantially vertically, means for advancing articles along said bed in a defined path of travel, a second conveyor positioned above said first conveyor and provided with a series of spaced hooks, said second conveyor including a portion extending in substantial vertical alignment with said defined path of travel of the articles on said first conveyor and along which portion the hooks travel in the same direction as said first conveyor, means for transferring said articles from said first conveyor to said hooks while rotating the axis of each article through substantially 90° comprising an overhanging end section provided on said first conveyor and forming a pivot surface about which said articles are tilted, an aperture formed in said bed in advance of said pivot surface, a tipping member positioned beneath said aperture and mounted for movement upwardly therethrough, and means for motivating said first conveyor, said second conveyor and said tipping member in timed relation whereby said tipping member is moved upwardly into engagement with an article after the leading end thereof has passed beyond said pivot surface to tilt such article about said pivot surface to an angle where the trailing end of said article has been raised above the supporting surface of a hook advancing on said second conveyor, whereby said article is engaged by said advancing hook for further tipping movement and transfer to said hook as said tipping member is lowered back through said aperture.

No references cited.